United States Patent [19]
Bernhard
[11] Patent Number: 5,066,121
[45] Date of Patent: Nov. 19, 1991

[54] METHOD AND APPARATUS FOR MEASURING THE FLASH DURATION OF A FLASH UNIT

[75] Inventor: Jean-Francois Bernhard, Morrens, Switzerland
[73] Assignee: Bron Elektronik AG, Allschwil, Switzerland

[21] Appl. No.: 415,075
[22] Filed: Sep. 29, 1989
[30] Foreign Application Priority Data
Sep. 30, 1988 [DE] Fed. Rep. of Germany ....... 3833208
[51] Int. Cl.[5] .......................... G01J 1/42; H01J 40/14
[52] U.S. Cl. .................................... 356/218; 356/226; 250/214 R; 354/416
[58] Field of Search ............... 356/218, 222, 224, 226, 356/227, 229, 213, 223; 250/561, 214 A, 214 R, 214 P, 214 L; 354/127.1, 424, 430, 413–423, 137, 138, 129, 145.1; 315/241 P

[56] References Cited

U.S. PATENT DOCUMENTS 2,996,624 8/1961 Mumma .......................... 250/214 R
3,802,768 4/1974 Robinson et al. ............... 250/214 R
4,479,704 10/1984 Masunaga .......................... 354/137
4,496,230 1/1985 Nakai et al. ......................... 354/416
4,636,053 1/1987 Sakane et al. .................. 250/214 A

*Primary Examiner*—Richard A. Rosenberger
*Assistant Examiner*—Hoa Pham
*Attorney, Agent, or Firm*—Robert W. Becker & Associates

[57] ABSTRACT

In a method of measuring the flash duration of a flash unit, the momentary light intensity is converted into an electrical signal that is determined and stored, and that is delayed by at least that time interval that exists between the beginning of the flash curve and the maximum thereof. The stored maximum is compared with the delayed signal, with the flash duration being determined from the signal obtained thereby. As a result, at the maximum of the intensity/flash duration curve, the information concerning the rising leg of this curve is still available. The apparatus comprises a sensing element for the flash intensity, with the sensing element being followed by a time-lag element and a peak detector, the outputs of which are connected to a comparator, the output of which is connected to a time-interval measuring circuit.

12 Claims, 1 Drawing Sheet

METHOD AND APPARATUS FOR MEASURING THE FLASH DURATION OF A FLASH UNIT

BACKGROUND OF THE INVENTION

The present invention relates to a method and apparatus for measuring the flash duration of a flash unit.

The flash duration of flash units can be defined in various ways. Best suited for estimating the anticipated sharpness or focus of a moving object is the so-called total flash duration t 0.1, the so-called tenth estimation. This time interval is measured from that point in time at which the momentary light intensity has exceeded 10% of its maximum. The end point is obtained when the momentary light intensity has again dropped below this value. With the aid of an intensity/flash duration curve, the flash duration can be easily determined; however, it is not practical to measure this flash duration. This is so because if one wishes to measure the flash duration, the problem exists that in the rising leg of the flash curve, one does not yet know how high the maximum of the light intensity will be. For this reason, the beginning of the desired flash duration can also not be fixed. On the other hand, if the maximum of the light intensity is exceeded, although one then knows the maximum value and also knows at what point in time the beginning of the measurement should have been effected, at this point in time the rising leg of the intensity/flash duration curve is no longer available.

It is therefore an object of the present invention to provide a method and apparatus with which for the first time the flash duration itself can be measured.

SUMMARY OF THE INVENTION

The method of the present invention is characterized by the steps of: converting a momentary light intensity into an electrical signal; determining and storing the maximum of this signal, while at the same time delaying this signal by at least that time interval that exists between the start of a flash curve and the maximum thereof; and comparing the stored maximum with the delayed signal to produce a signal that is used to determine the flash duration.

Pursuant to the method of the present invention, the momentary light intensity is converted into an electrical signal. This signal is then introduced into two paths. In one path, the maximum of the signal is determined and then stored, so that it is available for the later measurement. In the other path, the signal is delayed at least by that time interval that exists between the beginning of the flash curve and the maximum thereof. This assures that at the point in time of the maximum of the intensity/flash duration curve, the information concerning the rising leg of this curve is still available, since the curve shape of the delayed signal does not begin to rise until that point in time at which the value of the maximum, i.e. the stored maximum, is already known. The stored signal maximum is then compared with the delayed signal. From the signal obtained herefrom, the flash duration can then be very precisely and easily determined.

The apparatus of the present invention comprises: at least one sensing element for measuring the light intensity of a flash; a time-lag element; a peak detector, with the time-lag element and the peak detector being connected in parallel with the sensing element and having outputs; a comparator that is connected to the outputs of the time-lag element and the peak detector and itself has an output; and a time-interval measuring circuit that is connected to the output of the comparator.

The signal measured by the sensing element of the inventive apparatus is conveyed both to the time-lag element and to the peak detector, which are connected in parallel with one another. In the peak detector, the maximum of the light intensity is determined and stored, while in the time-lag element, the signal is delayed by that time interval that exists between the beginning of the flash curve and the maximum thereof. The signals delivered by the time-lag element and the peak detector are conveyed to the comparator, which compares these signals with one another and therefrom generates a signal concerning the length of the sought-after flash duration. In the subsequent time-interval measuring circuit, the pulse length, and hence the flash duration, are measured.

The measuring or sensing element is preferably connected to the time-lag element and the peak detector via an amplifier.

The peak detector is preferably followed by a divider that reduces the output signal of the peak detector to the desired extent.

This divider can in a known manner be adjustable, so that different types of flash durations can be measured Pursuant to one straightforward embodiment of the inventive apparatus, the amplifier delivers a voltage that is proportional to the measured light intensity.

Further specific features of the present invention will be described in detail subsequently.

BRIEF DESCRIPTION OF THE DRAWING

Other objects and advantages of the present invention appear in more detail in the following description in conjunction with the accompanying schematic drawing, in which.

DESCRIPTION OF PREFERRED EMBODIMENTS

Figure 1:
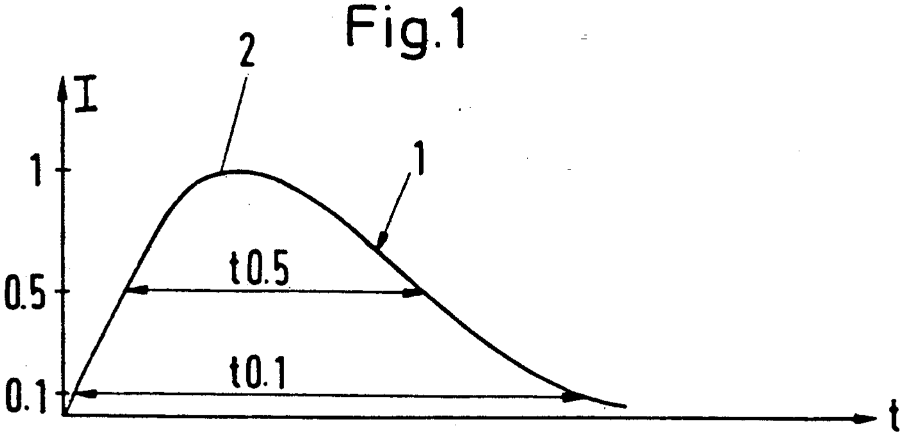
FIG. 1 is a graph in which the intensity of a flash is plotted as a function of the flash duration.

As is known, several definitions exist for determining the flash duration. The definition that is best suited for estimating the anticipated sharpness or focus of a moving object is the so-called total flash duration t 0.1 (one tenth estimation time). This is explained in conjunction with FIG. 1, where the intensity is plotted as a function of the flash duration. When a flash is triggered, the curve 1 results. This curve has a maximum 2 that is utilized to determine the total flash duration. The curve 1 is measured from that point in time at which the momentary light intensity exceeds 10% of its maximum 2 until that point in time at which the momentary light intensity again drops below this value. The total flash duration t 0.1 is indicated in FIG. 1.

The problem now is that in the rising leg of the flash curve 1, one does not yet know how high the maximum 2 will be. Therefore, it cannot be determined at what point in time the time t 0.1 is to be counted. If in contrast the maximum 2 is exceeded, one knows the maximum value 2 and then knows at what height the flash curve 1 must be cut in order to obtain the time t 0.1. Unfortunately, at this point in time the rising leg of the flash curve 1 is already passed, so that this information is no longer accessible.

Other definitions are also possible for the flash duration, for example the flash duration t 0.5. This is theoretically determined by measuring the flash duration from that point in time in which the momentary light intensity exceeds 50% of the maximum. This measurement is concluded when in the descending leg of the flash curve 1, the light intensity again drops below 50% of the maximum light intensity. However, also with this flash duration there exists the problem that at the beginning it is not known how high the maximum of the light intensity will be.

Figure 2:
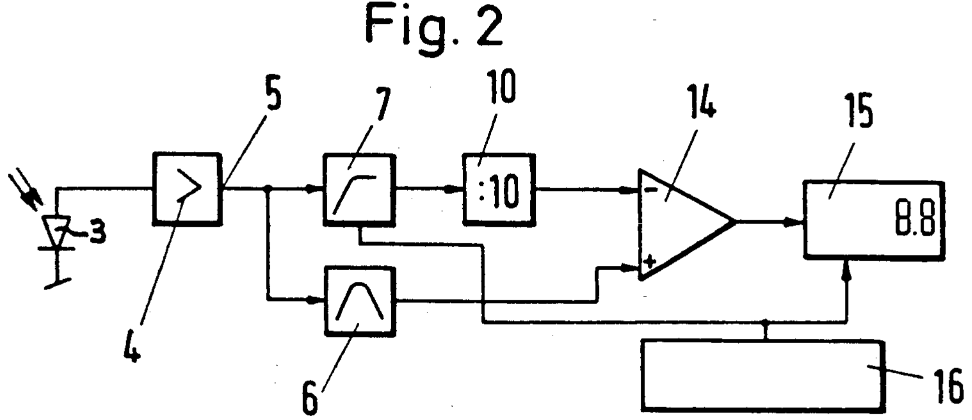
FIG. 2 is a block diagram showing the circuitry of one exemplary embodiment of the inventive apparatus.

In the illustrated exemplary embodiment of the present invention, it is possible to exactly measure the flash duration by converting the momentary light intensity into an electrical signal, for example a voltage, and to delay this signal by at least that amount of time that exists between the beginning of the flash curve and the maximum. As a result, at the point in time in which the maximum of the flash curve is reached, the information concerning the curve shape at the beginning of the flash curve is still available, since the curve at the start of the appropriate delay or time-lag switching begins to rise at a point in time at which the value of the maximum of the flash curve is already known. This will be explained in greater detail subsequently in conjunction with FIGS. 2 and 3. The (non-illustrated) apparatus has a measuring or sensing element 3, preferably a photodiode, which is connected to an input amplifier 4 that releases a voltage which is proportional to the intensity of the incident light that is measured by the sensing element 3. Consequently, the desired flash curve is visible at t he output 5 of the amplifier 4 as a voltage gradient. The output signal of the amplifier 4 is conveyed both to a time-lag element 6 and to a peak detector 7. This peak detector 7 retains the maximum of the voltage gradient and stores it. At the output of the peak detector 7 there is obtained a signal curve such as that indicated by the curve 8 in FIG. 3. Since the voltage is proportional to the intensity, the rising leg of the curve 8 has a similar path to the flash curve 1 of FIG. 1. As soon as the maximum 9 has been achieved, this voltage value is stored in the peak detector 7; in other words, the curve 8 now has an inclination zero. The actual path of the flash curve is shown by a dashed line in FIG. 3.

The output signal of the peak detector 7 is conveyed to a voltage divider 10, which is designed in conformity to the desired definition of the flash duration, for example 1/10 for t 0.1, ½ for t 0.5, etc. In the illustrated embodiment, the voltage divider 10 is designed for the aforementioned total flash duration t 0.1. The signal that results at the output of the voltage divider 10 is plotted in FIG. 3 as the curve 11.

Figure 3:
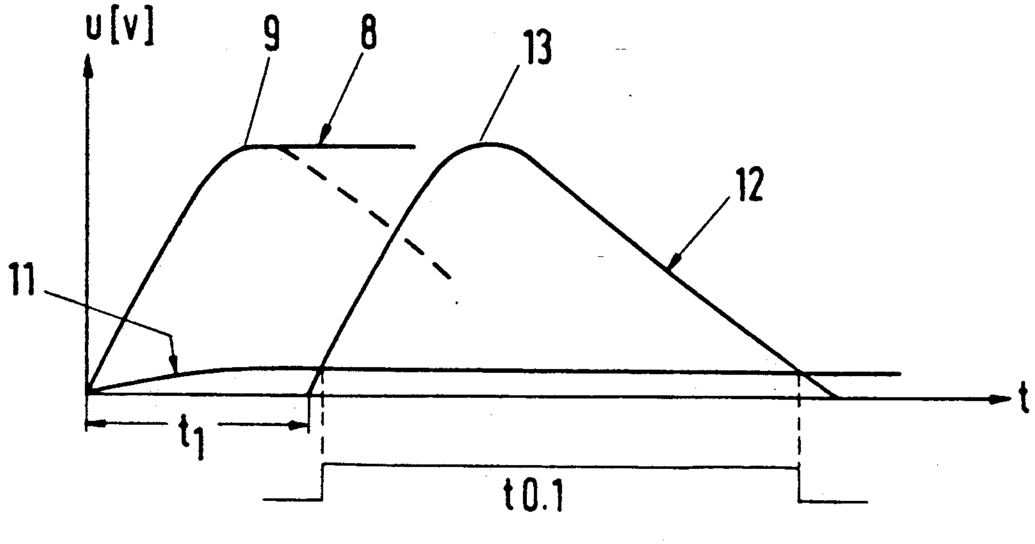
FIG. 3 is a graph in which the voltage obtained with the apparatus of FIG. 2 is plotted as a function of the flash duration.

In the time-lag element 6, the output signal of the amplifier 4 is delayed by at least that amount of time that exists between the beginning of the flash curve and the maximum thereof. This delay or time lag is indicated in FIG. 3 by $t_1$. The output signal of the time-lag element 6 has the path indicated by the curve 12 in FIG. 3. As clearly shown in FIG. 3, at the beginning of the curve 12 the maximum 9 of the voltage is already known. Since the maximum value 9 of the peak detector 7 is stored, at the time of the maximum 13 of the curve 12 the information of the curve shape at the beginning of the curve still exists. The output signal of the voltage divider 10 and the output signal of the time-lag element 6 are conveyed to a comparator 14. Consequently, at the output of the comparator 14 there results a pulse having the length of the desired flash duration, in the illustrated embodiment the total flash duration t 0.1. The pulse length is measured in a subsequent time-interval measuring circuit 15 and is thereupon indicated.

As can be seen from FIG. 3, the flash duration t 0.1 that is to be measured is not measured until delay time $t_1$ has passed.

With the inventive circuitry, it is possible for the first time to exactly measure the flash duration. The voltage divider 10 can also be adjustable, so that the flash duration can be determined in conformity with different definitions.

The inventive circuitry is preferably accommodated in a color temperature measuring device so that the indicator provided there can also be used for indicating the flash duration. However, the circuitry could also be accommodated in a separate device.

The time-interval measuring circuit 15 and the peak detector 7 can be reset via a start and reset circuit 16 prior to the beginning of a measurement.

The present invention is, of course, in no way restricted to the specific disclosure of the specification and drawing, but also encompasses any modifications within the scope of the appended claims.

What I claim is:

1. An apparatus for measuring a flash duration of a flash unit, comprising:
   at least one sensing element for measuring a light intensity of a flash;
   a time-lay element;
   a peak detector for detecting a maximum of an electrical signal resulting from converting said light intensity of said flash, with said time-lag element and said peak detector being connected in parallel with said at least one sensing element and each having an output;
   a comparator that is connected to said outputs of said time-lag element and said peak detector and itself has an output; and
   a time-interval measuring circuit that is connected to said output of said comparator.

2. An apparatus according to claim 1, which includes an amplifier disposed between said at least one sensing element and said time-lay element and said peak detector.

3. An apparatus according to claim 2, in which a divider follows said peak detector.

4. An apparatus according to claim 3, in which a start and reset circuit is connected to said peak detector and said time-interval measuring circuit.

5. An apparatus according to claim 4, in which said divider is adjustable.

6. An apparatus according to claim 4, in which said amplifier delivers a voltage that is proportional to the measured light intensity.

7. An apparatus according to claim 4, which apparatus is part of a color temperature measuring device.

8. An apparatus according to claim 4, in which said time-interval measuring circuit is provided with at least one indicator.

9. An apparatus according to claim 4, in which said sensing element is a photodiode.

10. A method of measuring a flash duration of a flash unit, including the steps of:

converting a momentary light intensity into an electrical signal;

determining and storing a maximum of said electrical signal, while at the same time delaying said electrical signal by at least a time interval that exists between a start of a flash curve and a maximum thereof; and comparing said stored maximum of said electrical signal with said delayed signal to produce a signal that is used to determine said flash duration.

11. A method according to claim 10, in which said converting step comprises converting said light intensity into a voltage.

12. A method according to claim 10, which includes the step of reducing said maximum of said electrical signal to a fraction of a value thereof.

* * * * *